United States Patent [19]

Parker

[11] Patent Number: 4,543,586

[45] Date of Patent: Sep. 24, 1985

[54] MAGNETIZING APPARATUS FOR A MAGNETOGRAPHIC PRINTER

[75] Inventor: Delmer G. Parker, Rochester, N.Y.

[73] Assignee: Xerox Corporation, Stamford, Conn.

[21] Appl. No.: 625,285

[22] Filed: Jun. 27, 1984

[51] Int. Cl.[4] .............................................. G01D 15/12

[52] U.S. Cl. .................................. 346/74.4; 346/74.2; 360/57; 360/59

[58] Field of Search ................ 346/74.2, 74.4; 360/57, 360/59

[56] References Cited

U.S. PATENT DOCUMENTS

| | | | |
|---|---|---|---|
| 3,522,090 | 7/1970 | Nacci | 117/239 |
| 3,554,798 | 1/1971 | Nacci | 117/235 |
| 3,555,556 | 1/1971 | Nacci | 346/74 |
| 3,555,557 | 1/1971 | Nacci | 346/74 |
| 3,698,005 | 10/1972 | Nacci et al. | 346/74 |
| 3,791,843 | 2/1974 | Kohlmannsperger | 117/17.5 |
| 3,804,511 | 4/1974 | Rait et al. | 355/17 |
| 3,845,306 | 10/1974 | Kohlmannsperger | 250/316 |
| 4,032,923 | 6/1977 | Pond et al. | 346/74.1 |
| 4,294,901 | 10/1981 | Genovese | 430/34 |
| 4,343,008 | 8/1982 | Swigert | 346/74.2 |
| 4,503,438 | 3/1985 | Saitoh et al. | 346/74.4 |

OTHER PUBLICATIONS

U.S. pending appln. (Xerox) entitled "Thermoremanent Magnetic Imaging Method" by R. E. Drews et al.; filed 7/20/83, S.N. 515,720.

*Primary Examiner*—Thomas H. Tarcza

*Attorney, Agent, or Firm*—Robert A. Chittum

[57] ABSTRACT

An energy efficient means for selectively pre-magnetizing a magnetic recording medium of a thermoremanent magnetographic printer is disclosed. It consists of a pair of axially aligned, elongated two-pole, substantially cylindrical permanent magnets separated by a narrow gap and oriented so that like poles of adjacent magnets confront one another across the gap. The recording medium moves between the magnets in a direction perpendicular to the magnets. The elongated magnets produce magnetic field components that are additive in the surface of the recording medium and that cancel in the direction normal to the recording medium's surface. The magnetizing field of the magnets may be turned off for latent image retention by rotating the magnets about 90 degrees. An alternate embodiment houses the magnets in a pair of fixed high permeability pole pieces which confront each other across a gap and act as high permeance conduits for the magnetic flux to create a strong pre-magnetizing field in the surface of the recording medium as it passes therethrough. Rotation of the magnets shunts the flux effectively eliminating any magnetic field from the region of the recording medium.

6 Claims, 7 Drawing Figures

MAGNETIZING APPARATUS FOR A MAGNETOGRAPHIC PRINTER

BACKGROUND OF THE INVENTION

1. Field of the Invention

The present invention relates to a magnetizing apparatus for use in a thermoremanent magnetographic printer and more particularly to a premagnetizing station in such a printer having energy efficient magnetizing apparatus therein that produces magnetization in the magnetic recording medium of the printer that is substantially devoid of a magnetization component normal to the plane of the medium.

2. Description of the Prior Art

It is known that heating a ferromagnetic material above a certain temperature will cause it to become paramagnetic. The temperature at which the ferromagnetic material loses its ferromagnetic properties is referred to as the Curie temperature. Normally, reversing the process or cooling the material below the Curie temperature will restore the ferromagnetic properties.

One important parameter of a ferromagnetic material affected by the temperature-induced phase change is a loss of remanent magnetization stored in the ferromagnetic material before it is heated. Generally, after the application of a sufficiently large magnetic field to a ferromagnetic material and its removal, the material will show a magnetic field of a certain magnitude and polarity that is remanent or remains. However, when a material having a remanent magnetization is carried into the paramagnetic phase by heating, the remanent magnetization is lost. Thus, the heating of a ferromagnetic material beyond its Curie temperature is used for erasing magnetization stored in a material. Further, since the coercivity of a ferromagnetic material is also a function of temperature and decreases to zero at the Curie point, the heating of a ferromagnetic material beyond its Curie point and cooling it in the presence of a magnetic field is a method of recording a magnetization therein based upon the applied magnetic field.

The formation of a magnetic latent graphic image on a magnetizable surface by thermomagnetic recording is well known in the art. U.S. Pat. No. 3,522,090 and U.S. Pat. No. 3,554,798, both to G. R. Nacci, relate to magnetic recording members particularly adapted for use in thermomagnetic recording and copying. U.S. Pat. Nos. 3,555,556 and 3,555,557, both also issued to R. Nacci, are illustrative of references that describe the process and apparatus for reflex recording of optical images on magnetic media. U.S. Pat. No. 3,698,005 to G. R. Nacci et al describes a recording member for reflexive imaging where a magnetic material is heated beyond its Curie temperature by a flash exposure procedure.

Thermoremanent magnetic imaging, from the above discussion, is simply an imaging technique that creates a latent magnetic image on a ferromagnetic material that is usually, but not necessarily, coated on an insulating substrate. The image is created by locally heating portions of the coating material above the Curie temperatue point to achieve a phase change in magnetic properties and simultaneously applying a magnetic field so that as the coating material cools in the presence of the applied magnetic field, the remanent magnetization from the applied field remains in the coating material, resulting in a latent magnetic image in the coating material. Such a latent magnetic image may be developed with magnetic toner, the toner transferred being in image configuration to a recording sheet such as paper and fixed thereto for a permanent copy.

U.S. Pat. No. 4,294,901 to Genovese discloses a multi-layered substrate for thermoremanent magnetic imaging. A conductive stylus array provides current between selected styli and through the substrate to heat locally selected portions in image configuration to the Curie temperature of the substrate. A magnetic latent image is formed when the heated portion of the member is allowed to cool in an externally applied magnetic field at a strength of between 10 and 200 gauss. In another embodiment, the substrate is premagnetized and the background image areas of the substrate are heated to the Curie temperature. The substrate is thereafter cooled in the absence of any externally applied magnetic field. In each embodiment, the latent image is developed by contacting the substrate containing the latent image with magnetic toner and transferring the developed image to a permanent sheet of, for example, paper and fixing the developed image thereto.

U.S. Pat. No. 3,804,511 to Rait et al. teaches the use of a tape having a recording medium on the surface which is magnetizable and capable of forming an electrostatic image. After a latent electrostatic image is formed and the image on the recording medium developed with toner having both an electrostatically attractive component and a magnetic component, the side of the tape opposite to the one containing the developed image is subjected to a continuous AC magnetizing current which applies a uniform magnetic recording in the recording medium through the tape. A latent magnetic image is formed in the recording medium by applying a magnetic erasing signal to the tape from the side of the tape confronting the developing image through the toner image, so that the toner shields the recording medium and only the non-image area of the recording medium is erased. Therefore, a latent magnetic image corresponding to or duplicating the latent electrostatic image is formed. The aim of Rait et al. was to enable multiple copies to be made from one latent image. After the first image was produced electrophotographically, the second and subsequent copies were obtained by developing the latent magnetic image with the same toner (that has a magnetic component) and transferring the developed image to paper without removing the latent magnetic image which is retained in the recording medium until specifically erased by another magnetic erasing signal applied after the last developed image is transferred to paper.

U.S. Pat. No. 4,032,923 to Pond et al. discloses a thermoremanent magnetographic imaging apparatus which copies xerographically produced images from a slave web onto a magnetizable surface of a master web. The termomagnetic transfer is produced by exposing the slave and master webs while in intimate contact to a single intense burst of radiation from a Xenon lamp. The master web is pre-recorded in alternating patterns of magnetization by an AC recording head. The frequency at which the record head is gated by the alternating current source determines the final image resolution. The radiant energy from the lamp raises the temperature of the master web above its Curie point in the non-image areas, thus erasing the pre-magnetization pattern of alternating magnetic pole directions in the non-image areas. The remaining image is then developed by magnetic toner and transferred to a copy sheet.

U.S. Pat. No. 4,343,008 to Swigert discloses a method of making a magnetic imaging master capable of development with magnetic toner and transfer of the developed image many times. The master is made by pre-magnetizing the master and inserting it into a conventional typewriter where character images are typed on a backing layer of the master creating a right reading image therein. The master is then flash exposed to a Xenon lamp which erases all pre-magnetized areas not shielded by the typed characters.

U.S. Pat. No. 3,791,843 and U.S. Pat. No. 3,845,306 to Kohlmannsperger discloses method and apparatus, respectively, for thermomagnetic imaging. These cases disclose the use of particular compounds such as Fe Rh, as a coating on the magnetic recording medium. Such compounds are antiferromagnetic at temperatures above and below a particular temperature known as the Neel temperature. In one embodiment, the coated recording medium is on a rotatable drum which is internally heated to its Neel temperature, and an original document is radiantly exposed on the recording medium at an exposure station in the typical successive incremental fashion well known in the art. The radiant exposure source emits radiant energy which passes through the original document, impinging on the recording medium. Those portions of the recording medium which register with the image-free portion of the original document are heated by the radiant source to a temperature above the normal Neel temperature. Consequently, such portions exhibit greatly reduced coercive force which is so weak that magnetic toner will not be retained at a development station.

Copending U.S. application entitled "Thermoremanent Magnetic Imaging Method" by R. E. Drews et al filed July 20, 1983 as Ser. No. 515,720 and assigned to the same assignee as this application discloses a thermoremanent magnetic imaging method and apparatus, wherein, among other features, the recording medium is pre-magnetized prior to entry of the medium into the printing or imaging station. Thus, it is known from the above that pre-magnetization of a magnetic recording medium can be accomplished with either a permanent magnet, an electromagnet, or an alternating recording head. The magnets produce a magnetization in the magnetic recording medium having magnetic pole directions all oriented in the same direction, while the alternating recording head or alternating electromagnets produce alternating rows of opposite magnetic pole directions. Since latent magnetic images are produced by magnetic fringe fields, the pre-magnetized recording medium must contain adjacent small regions of magnetization having opposite pole directions. The AC pre-magnetization is simply erased in the background regions by, for example, heating the recording medium above its Curie temperature. When the pre-magnetization has its magnetic pole direction all in the same direction, the imaging method taught by abovementioned application to R. E. Drews must be used, so that the recording medium is heated in image configuration to erase the pre-magnetization and subequently cooled in the presence of a magnetic field of opposite polarity to that of the pre-magnetization. The heating, of course, is done by one row of pixels at a time with a space therebetween. In this manner, small regions or pixels having opposite magnetic pole directions are formed.

The disadvantage of the single horeshoe permanent magnet, as disclosed in the prior art, is that the fringe field it produces always has a sizable component normal to the plane of the tape. This is undesirable because it weakens the development fields subsequently produced. The recording medium may also be pre-magnetized, according to the prior art, by passing it through a large DC powered solenoid, but such a solenoid requires around 30 watts to sustain a 500 oersted field across a 10 inch wide recording medium. Another drawback with the solenoid approach is that it is awkward to use with a pre-fabricated endless recording medium because it must pass through the solenoid.

The prior art discloses, alternatively, that the reocrding medium can be pre-magnetized by employing a pair of opposing, recording head-like electromagnets. However, to generate the required field over a 10 inch wide recording medium with a reasonable gap or spacing therebetween of about 0.1 inch requires around 20 watts during the pre-magnetization operation. In all known prior art, either there is a significant power requirement or there is an undesirable magnetization component normal to the plane of the recording medium present during the pre-magnetization process.

SUMMARY OF THE INVENTION

It is the object of this invention to provide a pre-magnetization apparatus for a thermoremanent magnetographic printer which requires no energy usage for the magnetization operation and produces no magnetic field components in a direction normal to the recording medium receiving the pre-magnetization.

It is another object of this invention to provide a pre-magnetization apparatus consisting of at least one pair of opposing elongated, permanent magnets having parallel axes and annular cross-sections to overcome the disadvantages of electromagnets and the single horeshoe magnet techniques.

It is still another object of this invention to position at least one pair of elongated, annular permanent magnets at a pre-magnetization station of a thermoremanent magnetographic printer, each magnet having a longitudinal pair of magnetic poles with like poles confronting each other in a spaced relationship and with a magnetic recording medium adapted to move therebetween.

A further object of this invention is to provide means for removing the magnetizing field of the annular magnets from the vicinity of the recording medium so that the latent magnetic image may be retained for multiple copies to be produced therefrom.

In the present invention, a pre-magnetization station in a thermoremanent magnetographic printer or copier consists of at least one pair of axially aligned, two pole permanent magnets having annular cross-sections separated by a gap and oriented so that like poles on adjacent magnets confront each other. The recording medium is pre-magnetized by being passed through the center of the gap, referred to as a neutral plane, between the two magnets, so that the magnets' field components are additive in the plane of the recording medium but cancel in the direction normal to the recording medium's surface. The pre-magnetizing field is turned off for image retention by rotating the two magnets about 90 degrees.

DESCRIPTION OF THE PREFERRED EMBODIMENT

Figure 1:
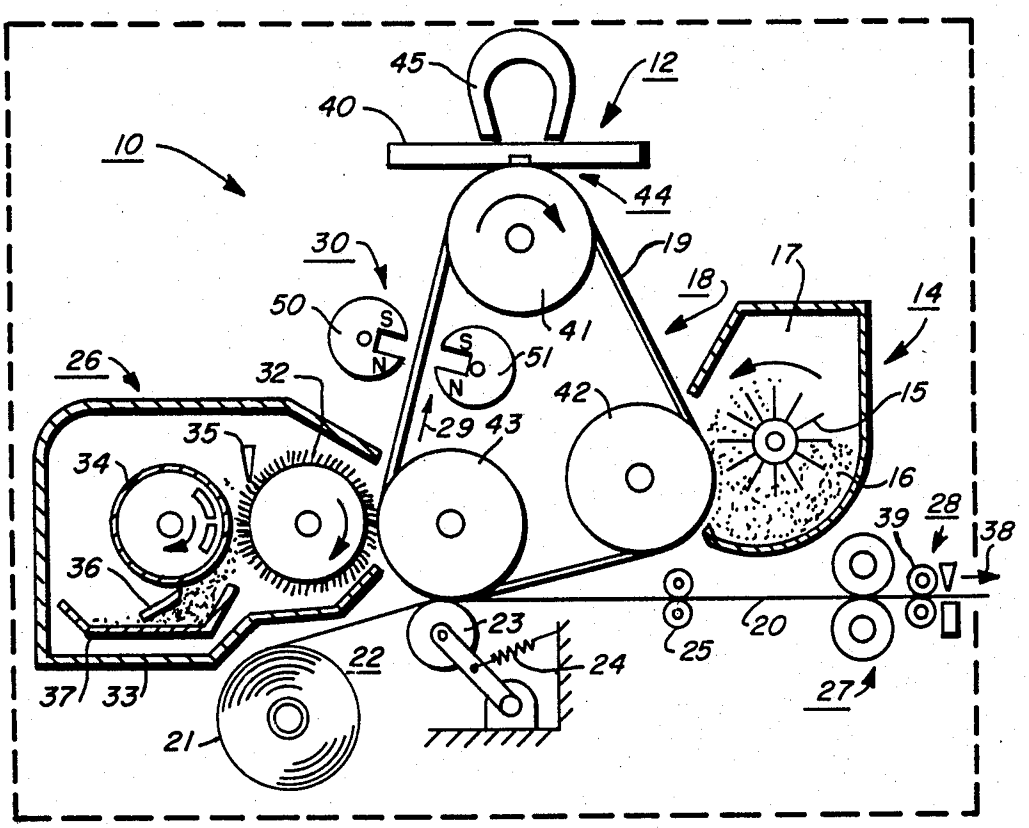
FIG. 1 is an elevation view of a schematic system diagram for a thermoremanent magnetic imaging printer which incorporates the pre-magnetizing apparatus forming the subject matter of this invention.

In FIG. 1, there is shown a thermoremanent magnetic imaging system, generally designated by the numeral 10, incorporating a magnetic imaging station 12. The imaging system 10 includes a series of process stations through which a recording medium 18 in the form of an endless belt mounted over rollers 41, 42 and 43 passes. Although this embodiment uses an endless belt configuration for the recording medium, various other configurations could be used equally as well such as, for example, one having a supply roll and a take-up roll which may be rewound when the supply is depleted. Beginning with the imaging station 12, the recording medium 18 proceeds past a development station 14, a transfer station 22, and a cleaning station 26 in the direction of arrow 29. The development, transfer and cleaning stations are typical stations well known in the magnetography field.

At development station 14, a rotating brush or paddle wheel 15, housed in hopper 17, presents magnetic toner 16 onto the recording surface 19 of recording medium 18. The toner is attracted and held by the latent magnetic image and is transferred to a permanent material 20, such as paper, at transfer station 22. After the developed image is transferred, the recording medium proceeds past cleaning station 26, past a pre-magnetizing station 30 comprising the magnetizing apparatus of the present invention and back to the imaging station 12.

The developed image is pressure transferred to the paper 20 at the transfer station 22. The paper is provided by supply roll 21 which is pulled through the transfer staton via drive rolls 25 and through a toner fixing station 27 by drive rolls 39 where the toner image is permanently fixed to the paper moving in the direction of arrow 38. Cutter assembly 28 cuts the paper with the fixed images into separate sheets. The transfer station includes pressure roller 23 which is urged by adjustable spring 24 towards the recording medium as the recording medium moves around support roller 43. The paper is squeezed against the developed toner image between rollers 23 and 43 to effect the pressure transfer. An electrostatic transfer technique, as is well known in the art, could also be used to effect transfer of toner image to the paper.

Subsequent to the developed image transfer, the recording medium is moved past the cleaning station 26 which removes any residual toner not transferred to the paper. A soft brush 32 housed in chamber 33 removes the residual toner from the recording medium 18 and a single magnetic brush roll 34 is used to remove the toner from the brush. A conventional flicker bar 35 is arranged to assist in toner removal from the soft brush and a doctor blade 36 is used on the magnetic brush 34 roll to remove the residual toner therefrom into a collecting tray 37 so that the residual toner may optionally be reused.

A preferred choice for the recording medium 18 is a magnetic tape having a chromium dioxide recording surface sold under the trade name Crolyn ® by the E. I. DuPont Company, Wilmington, Del. The Curie point of Crolyn is about 132° C., which is low enough to provide excellent results in a thermoremanent magnetic imaging environment.

The recording medium 18 having a magnetizable layer 19 moves around roller 41 in the direction of arrow 29. The roller 41 forms a nip 44 and urges the surface of the magnetizable layer of the recording medium into contact with a thermal printhead 40 such as the one marketed by the Rohm Corporation under the designation Rohm Kh-106-6 or a 300 spi thermal printer sold by the Mitsubishi Electric Corporation of Japan under the designation S 215-12. The biasing force of the roller 41 may be varied from 0.1 to 6 pounds per lineal inch (pli), but the preferred range is 1 to 4 pli.

The magnetizable surface of the recording medium is premagnetized at the pre-magnetizing station 30 by a rotatably mounted pair of elongated cylindrically shaped permanent mangets 50,51, more fully described later, that produce a pre-magnetization field of between 600 and 4000 Oe; the preferred field strength is between 1000 and 1600 Oe. At the image nip 44, the thermal elements of the printhead are activated by the selective application of a voltage across the individual heating element according to data signals received form a controller (not shown) to heat, in image configuration, small areas or pixels of the magnetizable surface above the Curie point of the magnetizable surface in the presence of a magnetizing field produced by permanent magnet 45. Magnet 45 has a polarity opposite to that produced by pre-magnetizing magnets 50,51. The magnetization field at the nip produced by magnet 45 should be below the coercivity of the magnetizable layer 19 and in the preferred embodiment, limited to 1/6 to 2/5 that of the pre-magnetizing magnets 50,51. Therefore, the magnetic field at the nip is about 400 Oe or less. The field strength of magnet 45 is too weak to have an appreciable affect on the pre-magnetized recording medium, except in areas heated above the record medium Curie point.

Figure 3:
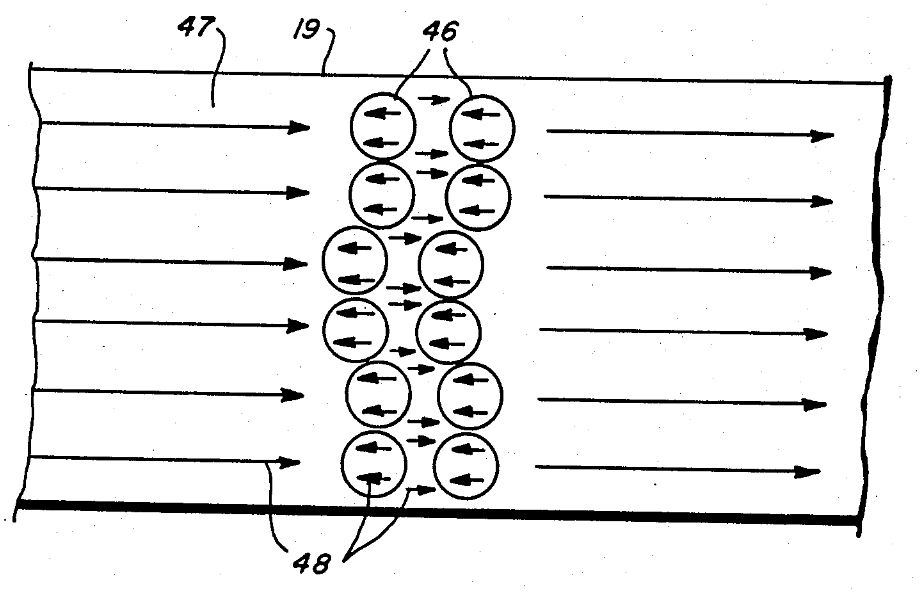
FIG. 3 is a schematic representation illustrating the magnetic pole direction of the pixels and the pre-magnetized background area after the pixels have been formed by the thermal printhead in the presence of a magnetizing field at the nip.

When the thermal elements of the printhead are activated by the data signals to form pixels in image configuration, the pixels on the magnetizable surface of the recording medium are heated to the Curie point of the magnetizable surface. This heating is done at the nip so that the premagnetization in the pixels is erased and the magnetizing field of magnet 45 is able to induce a magnetism in the pixels having a magnetic polarity opposite to that of the pre-magnetized background area. The activation or heating time of the thermal elements in conjunction with the surface speed of the recording medium enables the heated pixel areas to cool while still in the magnetic field at the nip, thus fixing the switched magnetization regions in the pixels areas, as seen in FIG. 3. The opposing magnetization 48 in the pre-magnetized background area 47 and the pixel regions 46 form fringe fields which attract and hold magnetic toner during subsequent development of the latent magnetic image which is formed by the pixels 46.

The time between thermal element activations is optionally of a duration of between 1-13 ms which assures appropriate spacings between succeeding pixels. As discussed above, this is important for copy quality, because, if the pixel magnetization regions are too close together, the infringe fields occur only around the periphery of a group of pixels. This leaves areas which weakly attract and hold toner, even though it is part of the image. Therefore, if this situation exists, blank spaces may be visible in the final copy.

The moving magnetizable surface of the recording medium must be heated to the Curie point in image configuration composed of separate pixels and cooled in the presence of a fixed magnetic field located at the nip. Otherwise, the erased pre-magnetization will be induced again in the pixels by the surrounding pre-magnetized area, if the pixels are left with zero magnetization. The magnetization of the pixel regions will not be switched, if the pixel area cools below the Curie point outside the opposing magnetic field of the nip. If the voltage which activates the printhead thermal elements are too large the pixel is heated much beyond the Curie point and takes too long to cool, so that the moving recording medium may be outside the opposing fixed field when it cools. This also means the pixels are too large and they begin to merge together, moving the fringe fields, if any, to the outer periphery of the pixel clusters. If the voltage is too low, the pixels are too small and the resulting fringe fields do not attract and hold enough toner. The copies in this situation are too light because an adequate denstiy was not achieved.

Other important parameters of the imaging station which affect the pixel size and spacing are the thermal element activation times, the contact pressure of the recording medium to the printhead, and surface speed of recording medium relative to the printhead and opposing magnetic field.

Figure 2A:
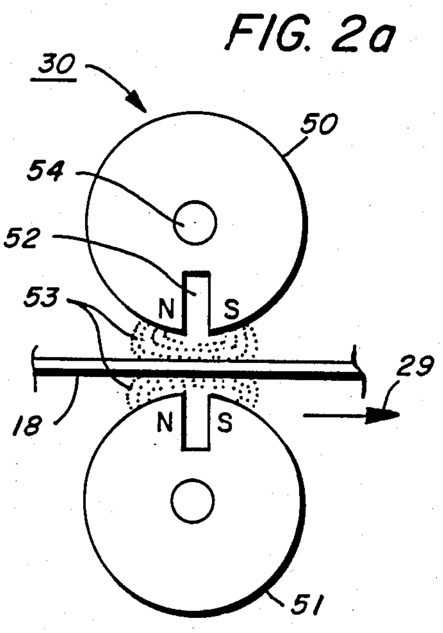
FIG. 2A is a slightly enlarged elevation view of the pre-magnetizing apparatus of FIG. 1 positioned to pre-magnetize the recording medium.
Figure 2B:
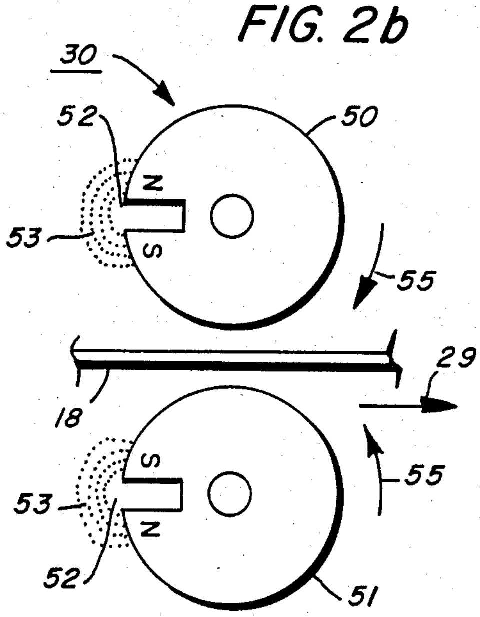
FIG. 2B is an elevation view of the pre-magnetizing apparatus similar to that of FIG. 2A, but the magnets are rotated to a position to prevent their magnetic fields from being in the vicinity of the recording medium.
Figure 2C:
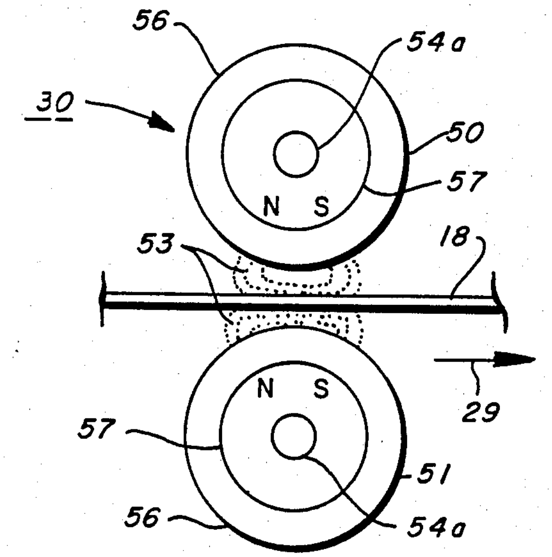
FIG. 2C is an elevation view of an alternate embodiment of the pre-magnetizing apparatus, using a tubular magnet instead of the cylindrical horseshoe type.

Referring to FIGS. 2A and 2B, each cylindrical magnet 50, 51 has a pair of elongated magnetic poles along a groove 52 therein. Optionally, a pair of elongated magnetic poles are formed axially along tubular surfaces as seen in FIG. 2C. The poles or the grooves extend along the axes of the magnets 50, 51 and the poles or grooves and magnet axes 54 or shaft axes 54*a* are parallel to each other. The two magnets 50, 51 forming the pre-magentization station are rotatably mounted and spaced apart enough to form a gap therebetween, so that the recording medium moves through the center thereof in a neutral plane on its way to the imaging station 12. The axes of the magnets 50, 51 are perpendicular to the direction of movement of the recording medium 18 as shown by arrow 29.

In the preferred embodiment, the magnets 50, 51 are spaced apart around 0.1 inches and are adapted to be rotated in synchronism between the position of FIG. 2A, whereat the magnets pre-magnetize the recording medium and the position of FIG. 2B, whereat the magnets do not pre-magnetize the recording medium. When the magnets 50, 51 are positioned to pre-magnetize the recording shown in FIG. 2A or 2C, like poles confront each other, so that components of the magnetic fields 53 that are normal to the surface of the recording medium 18 cancel each other in this neutral plane, leaving only the pre-magnetizing component 47 in the plane or surface of the recording medium, as shown in FIG. 3.

When more than one copy of the latent magnetic image generated at the imaging station 12 is to be made, the cylindrical magnets 50, 51 are synchronously rotated to move the magnetic fields 53 away from the recording medium 18. In the preferred embodiment, the pre-magnetizing magnets 50,51 are concurrently rotated in the direction of arrow 55 for about 90 degrees. As the last copy of the latent magnetic image is transferred to the paper 20 at the transfer station 22, the cylindrical magnets 50, 51 are rotated back to their original location of confronting like poles to solidly pre-magnetize the entire recording medium during its passage between the magnets. The pre-magnetization erases the previous latent magnetic image by reversing all of the pixels containing oppositely directed magnetization because the pre-magentizing strength of the cylindrical magnets 50, 51 at the pre-magnetizing station have much higher strength than the permanent magnet 45 utilized at the imaging station 12. Any well known means may be used to rotate the pre-magnetizing magnets 50, 51, such as mechanical linkage actuated automatically by a solenoid or cam (not shown).

In the embodiment of the pre-magnetizing station shown in FIG. 2C, the magnets 50, 51 where made out of 0.9 inch outside diameter, KORSEAL ® tubing 56 sold by B. F. Goodrich, which were cut to 10 inch lengths to extend across the full width of the recording medium. KORSEAL is an inexpensive, extruded magnetic material consisting of an elastomer matrix binder and barium ferrite powder. A pair of poles about ⅜ inch apart were created on each magnet using an impulse magnetizer and a pole piece to shape the field. Each tubular magnet 56 is mounted on a shaft 57 that is supported at both ends so that the two cylindrical magnets are slightly spaced apart and aligned axially with one another. The two magnets 50, 51 are spaced around 0.1 inch apart with confronting like poles that are perpendicular to the direction of movement of the recording medium 18. The field strength at this gap distance is about 1000 Oe. High field strengths of about 1200 Oe can be achieved with ceramic cylindrical magnets of the same outside diameter, such as, Stackpole Magnets designated A19 and sold by the Stackpole Magnet Company. Large diameter cylindrical magnets or elongated horseshoe (cylindrical with a groove) permanent magnets having substantially annular cross-sections produce field strength in excess of 2000 Oe. However, it should be clear that since only a portion of the circumference of the tubular magnets are used, see FIG. 2C, a more economical design woud employ only magnetized elongated arcuate segments.

Figure 4A:
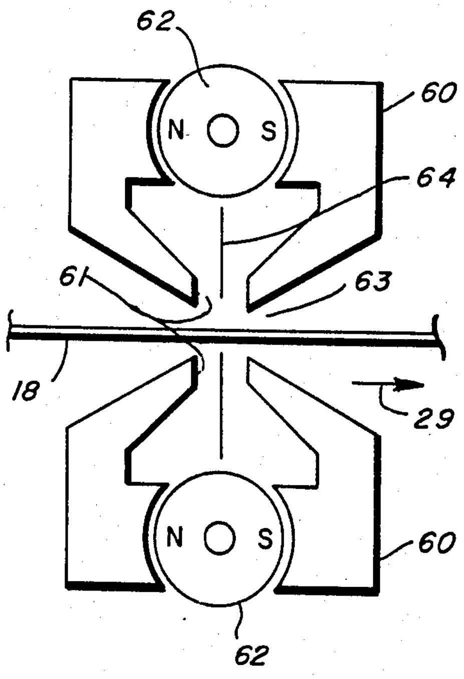
FIG. 4A is an alternate embodiment for that of FIGS. 2A and 2C, wherein a pair of high permeable pole pieces house cylindrical, rotatably mounted magnets.
Figure 4B:
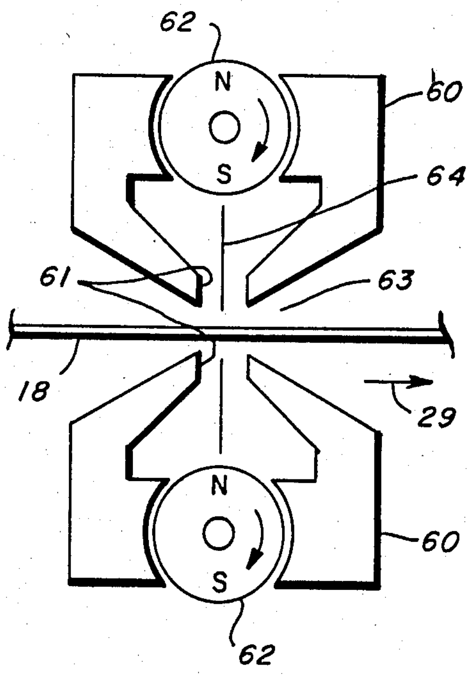
FIG. 4B shows the arrangement of FIG. 4A wherein the magnets have been rotated to remove the magnetic field.

An alternate embodiment of the present invention is shown in FIGS. 4A and 4B. A pair of elongated, high permeability pole pieces 60, having a cross-sectional area in the general shape of a horseshoe, are used each with an elongated cylindrical magnet 62 rotatably mounted in the base thereof, opposite the open ends 61, to create the required magnetizing field to pre-magnetize the recording medium 18 moving therebetween in the direction of arrow 29. The cylindrical magnets 62 are magnetized through their diameter with the north and south poles on opposite sides. When the magnets 62 are oriented, perpendicular to the direction of movement of the recording medium as shown in FIG. 4A, the pole pieces 60 act as high permeance conduits for the magnetic flux and create a strong magnetic field in the surface of the recording medium as it passes through the space or gap 63 between the pair of pole pieces. The gap distance is about 0.1 inch, as in the preferred embodiment of FIGS. 2A and 2B and alternate embodiment in FIG. 2C. To pre-magnetize the recording medium, the poles of magnets 62 lie in planes parallel to the recording medium with like poles of both magnets lying on the same side of centerline 64. If the magnets 62 are rotated about 90 degrees as shown in FIG. 4B, the pole pieces 60 act as magnetic shunts, thus effectively eliminating any magnetic field from the vicinity of the recording medium. In the non-magnetizing position shown in FIG. 4B, the poles of the pair of magnets 62 are substantially aligned with the pole piece centerline 64 with the outer most poles being of opposite polarity. The cylindrical magnets 62 may be rotated by any well known means such as by solenoid or cam actuated linkage responsive to typical control signals generated by the processor (not shown) of printer 10. Such signals would indicate when multiple copies are to be made of a latent magnetic image and when the last copy of the multiple run has been transferred.

In recapitulation, the present invention provides the apparatus for energy efficient, pre-magnetization of a recording medium of a thermoremanent magnetographic printer. The pre-magnetization is accomplished by a pair of axially aligned, elongated two-pole permanent magnets having substantially annular cross sections which are rotatably mounted and separated by a gap so that the recording medium can be moved therebetween in the center of the gap. The poles of the magnets are perpendicular to the direction of movement of the recording medium and, in one embodiment, oriented so that like poles on adjacent magnets confront each other across the gap. The recording medium or the surface thereof is pre-magnetized with a magnetization having its magnetic poles aligned in the same direction. This orientation of the magnets produce magnetic field components which are additive in the surface or plane of the recording medium and cancel field components in the direction normal to the recording medium. When the magnets are rotated about 90 degrees with respect to the recording medium, the magnetizing field is removed from the vicinity of the recording medium or turned off. An alternate embodiment uses a pair of high-permeable, pole pieces to house the rotatable magnets which act as permeance conduits for the magnetic flux and create a strong field in the plane of the recording medium. Rotation of both magnets housed within the pole pieces shunts the magnetic flux and eliminates any field from the region of the recording medium.

Many modifications and variations are apparent from the foregoing description of the invention and all such modifications and variations are intended to be within the scope of the present invention.

I claim:

1. A magnetizing apparatus for use in a thermoremanent magnetographic printer to pre-magnetize selectively a movable magnetic recording medium of the printer at a pre-magnetization station prior to the recording medium's entry into an imaging station whereat a latent magnetic image is formed in the surface thereof, comprising:

at least one pair of elongated, permanent magnets being rotatably mounted upstream of the imaging station of the printer, the magnets being parallel to each other and spaced apart a predetermined distance to form a gap therebetween, the magnetic recording medium being movable between the magnets substantially in the center of said gap and in a direction perpendicular to said magnets; and means for selectively rotating the magnets about their elongated direction from a first position whereat the magnetic recording medium is pre-magnetized, to a second position whereat the magnetic recording medium is not pre-magnetized; when the magnets are in said first position, components of the magnetic field of said magnets are additive in the plane of the recording medium and components of the magnetic field cancel each other in the plane normal to the recording medium, and when the magnets are in said second position, the magnetic fields of the magnets are removed from the vicinity of the recording medium, so that a previously formed latent image on said recording medium may pass between the magnets unaltered, when the magnets are in their second position, for the production of multiple copies by the printer without the need of reforming that image at the imaging station.

2. The magnetizating apparatus of claim 1, wherein the pair of elongated permanent magnets are substantially cylindrical.

3. The magnetizing apparatus of claim 2, wherein said cylindrical magnets have a groove along their length across which opposite magnet poles confront each other in the same manner as a horseshoe-type permanent magnet.

4. The magnetizing apparatus of claim 2, wherein each of said magnets are formed by magnetizing at least two adjacent parallel, arcuate portions of a magnetizable tubular member along the length thereof, so that the elongated arcuate portions of said tubular member have opposite polarities that produce a magnetic field therebetween.

5. The magnetizing apparatus of claim 4, wherein only the magnetized arcuate portions of the tubular member are used, said magnetized arcuate portions being mounted on spaced, rotatable shafts which are parallel to each other and perpendicular to the direction of movement of the recording medium, said recording medium moving between the shafts to encounter the magnetic fields generated by said arcuate portions when they are in said first position.

6. The magnetizing apparatus of claim 1, further comprising at least one pair of elongated, high-permeability members, each having a bifurcated cross-section that forms a pair of parallel ends, the ends of one member confronting the ends of the other and being spaced a predetermined distance apart to form said gap through which the recording medium passes; in each high-permeability member, a one of the rotatable magnets is mounted in a location opposite the ends thereof, so that said members act as a high permeance conduit for the magnetic fields of the magnets when said magnets are oriented in said first position and act as magnetic shunts when said magents are oriented in said second position.

* * * * *